(12) United States Patent
Lee (10) Patent No.: US 8,330,821 B2
(45) Date of Patent: Dec. 11, 2012

(54) MOBILE TERMINAL AND IMAGE PROCESSING METHOD

(75) Inventor: Donghoon Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 547 days.

(21) Appl. No.: 11/777,451

(22) Filed: Jul. 13, 2007

(65) Prior Publication Data
US 2008/0012952 A1 Jan. 17, 2008

(30) Foreign Application Priority Data
Jul. 14, 2006 (KR) .................. 10-2006-0066421

(51) Int. Cl.
H04N 5/225 (2006.01)
H04N 5/232 (2006.01)
H04N 5/76 (2006.01)
H04N 9/74 (2006.01)

(52) U.S. Cl. ........... 348/207.99; 348/211.11; 348/231.3; 348/584

(58) Field of Classification Search ............. 348/207.99, 348/211.11, 231.3, 584
See application file for complete search history.

(56) References Cited

U.S. PATENT DOCUMENTS

| 6,807,232 B2* | 10/2004 | Nicholson et al. ........ 375/240.26 |
| 7,298,964 B2* | 11/2007 | Ishikawa et al. .............. 386/223 |
| 2003/0016753 A1* | 1/2003 | Kim et al. ................. 375/240.21 |
| 2004/0119882 A1* | 6/2004 | Maruno et al. ................. 348/375 |
| 2005/0140778 A1* | 6/2005 | Kim et al. .................. 348/14.02 |
| 2006/0037050 A1* | 2/2006 | Bae et al. ......................... 725/62 |
| 2007/0070210 A1* | 3/2007 | Piccionelli et al. ...... 348/211.11 |
| 2007/0103558 A1* | 5/2007 | Cai et al. .................. 348/211.11 |
| 2007/0177025 A1* | 8/2007 | Kopet et al. ............... 348/222.1 |
| 2008/0225121 A1* | 9/2008 | Yoshida et al. ............... 348/159 |

FOREIGN PATENT DOCUMENTS
KR 1020060046955 5/2006
* cited by examiner

Primary Examiner — Chieh M Fan
Assistant Examiner — Quang Le
(74) Attorney, Agent, or Firm — Lee, Hong, Degerman, Kang & Waimey

(57) ABSTRACT

A mobile terminal including a plurality of cameras and a method of processing images acquired in a plurality of cameras is provided. The image processing method includes simultaneously operating a plurality of cameras, outputting a synchronous signal during an inactive time period and a data image signal during an active time period, wherein the active time period during which one camera of the plurality of cameras provides the data image signal occurs during the inactive time period of the other camera or cameras of the plurality of cameras.

14 Claims, 12 Drawing Sheets

MOBILE TERMINAL AND IMAGE PROCESSING METHOD

CROSS-REFERENCE TO RELATED APPLICATION

Pursuant to 35 U.S.C. §119(a), this application claims the benefit of earlier filing date and right of priority of Korean Application No. 10-2006-0066421, filed on Jul. 14, 2006, the contents of which are hereby incorporated by reference herein in their entirety.

FIELD OF THE INVENTION

The present invention is directed to a mobile terminal having a plurality of cameras and a method for processing images acquired in the plurality of cameras.

DESCRIPTION OF THE RELATED ART

In accordance with the development of electronic communication technology, mobile terminals now include various functions for versatile operation, such as a camera mode for capturing photograph images.

A mobile terminal may include two or more camera modules for the camera mode. In many cases, the mobile terminal cannot process two or more signals outputted from the camera modules.

SUMMARY OF THE INVENTION

In one aspect of the present invention, a mobile terminal includes a plurality of cameras individually providing a synchronous signal during an inactive time period and a data image signal during an active time period, wherein the active time period during which one camera of the plurality of cameras provides the data image signal occurs during the inactive time period of the other camera or cameras of the plurality of cameras, and an image processor configured to receive and process the synchronous signal and the data image signal.

It is contemplated that a data frame is defined by the inactive time period and the active time period.

It is further contemplated that the plurality of cameras individually provide a plurality of synchronous signals during a corresponding plurality of inactive time periods, and a plurality of data image signals during a corresponding plurality of active time periods, wherein each of the plurality of active periods during which one camera of the plurality of cameras provides one of the plurality of data image signals occurs during one of the plurality of inactive time periods of the other camera or cameras of the plurality of cameras, and wherein the image processor is further configured to receive and process the synchronous signals and the data image signals.

It is contemplated that the plurality of cameras output an End Of Frame (EOF) signal informing an end of the active time to the image processor, and the image processor outputs a control signal corresponding to the EOF signal to the other cameras among the plurality of cameras. It is further contemplated that the synchronous signals are vertical synchronous signals, wherein the EOF signal is a falling edge signal of a vertical synchronous signal.

It is contemplated that the plurality of cameras output the synchronous signals and the image signals to the image processor through the same signal line, and the EOF signal is inserted between frames of the image signals. It is further contemplated that the plurality of cameras output the synchronous signals and the image signals to the image processor through the same signal line integrating separate signal lines extended from the plurality of cameras.

It is contemplated that the plurality of cameras output the synchronous signals and the image signals to the image processor through separate signal lines. It is further contemplated that the mobile terminal further includes a controller for controlling general operations, wherein the image processor is configured within the controller.

It is contemplated that further comprising at least one of a display, a communication unit, and a memory to receive and process the image data outputted from the image processor.

In another aspect of the present invention, a method for processing image data in a mobile terminal includes simultaneously operating a plurality of cameras, outputting a synchronous signal during an inactive time period and a data image signal during an active time period, wherein the active time period during which one camera of the plurality of cameras provides the data image signal occurs during the inactive time period of the other camera or cameras of the plurality of cameras, and receiving and processing the synchronous signals and the image signals outputted from the cameras.

It is contemplated that the method further includes outputting a control signal corresponding to an End Of Frame (EOF) signal to the other of the plurality of cameras that have not outputted an EOF signal among the cameras, wherein the EOF signals for informing that an active time is terminated are individually outputted from the plurality of cameras. It is further contemplated that the synchronous signals are vertical synchronous signals, wherein the EOF signal is generated when a vertical synchronous signal falls down.

It is contemplated that the plurality of cameras output the synchronous signals and the image signals through the same signal line and the EOF signal is activated between the frames of the image signals outputted by the plurality of cameras. It is further contemplated that the cameras output the synchronous signals and the image signals to the image processor through the same signal line by integrating the signal lines extending from the plurality of cameras.

It is contemplated that the cameras output the synchronous signals and image signals to the image processor through separate signal lines. It is further contemplated that the image signals of objects captured by two of the plurality of cameras are outputted during inactive times of another of the plurality of cameras.

It is contemplated that when the object captured by one of the plurality of cameras is outputted for at least one of displaying, communicating and storing the image signal, another object captured by another of the plurality of cameras is outputted for another one of displaying, communicating and storing that image signal.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed. These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF PREFERRED EMBODIMENTS

The embodiments of the present invention will be described in detail with reference to the accompanying drawings. The aspects and features of the present invention and methods for achieving the aspects and features will be apparent by referring to the embodiments to be described in detail with reference to the accompanying drawings. However, the present invention is not limited to the embodiments disclosed hereinafter but can be implemented in diverse forms.

The matters defined in the description, such as the detailed construction and elements, are specific details provided to assist those of ordinary skill in the art in a comprehensive understanding of the invention, and the present invention is only defined within the scope of the appended claims. In the entire description of the present invention, the same drawing reference numerals are used for the same elements across various figures.

Hereinafter, preferred embodiments of the present invention will be described with reference to the accompanying drawings.

Figure 1:
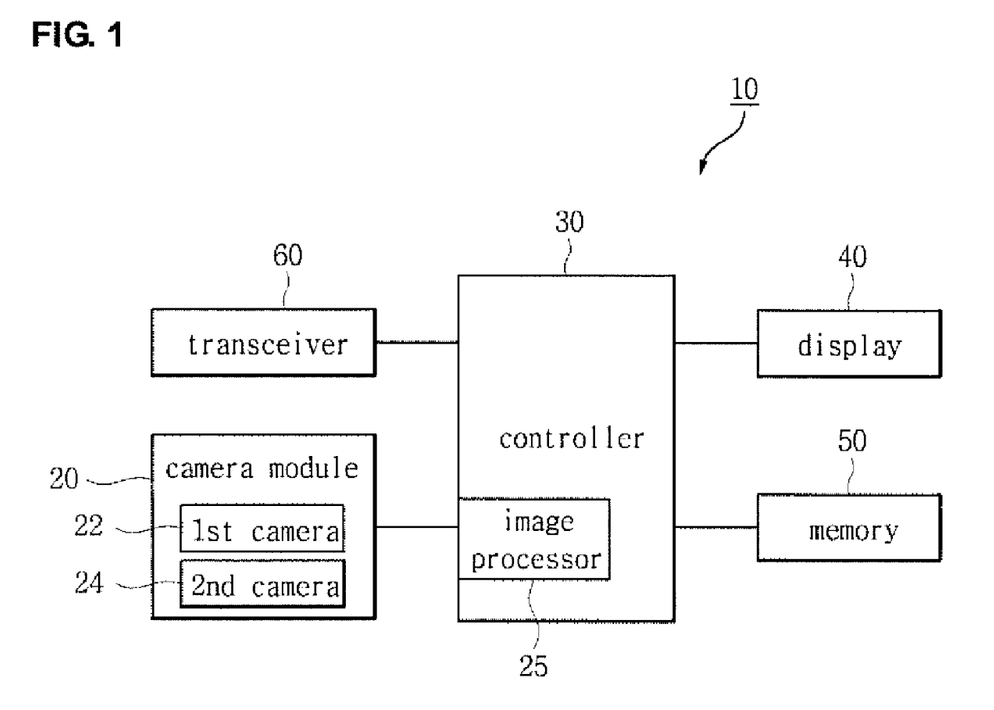
FIG. 1 is a block diagram illustrating a mobile terminal according to an embodiment of the present invention.

Referring to FIG. 1, a mobile terminal 10 of an embodiment of the present invention comprises a camera module 20, an image processor 25, a controller 30, a display 40, a memory 50, and a transceiver 60.

The camera module 20 comprises a first camera 22 and a second camera 24. Each of the two cameras 22, 24 comprise a sensor (not shown) for photographing an object and a signal processor (not shown) for converting analog electrical signals inputted from the sensor into digital signals.

The sensors used in the two cameras 22, 24 may be Complementary Metal Oxide Semiconductor (CMOS) sensors or Charge Coupled Device (CCD) sensors, but are not limited thereto. The signal processor may be a digital signal processor (DSP) or it may be configured in the controller 30. When the signal processor is configured in the controller 30, the signal processor is configured independently from the camera module 20. In the present specification, however, the signal processor will be referred to as being included in the camera module 20, unless it is indicated otherwise.

In an embodiment, the first and second cameras 22, 24 simultaneously output image signals acquired by individually photographing an object, and collectively output synchronous signals into the image processor 25. The synchronous signals have two types; horizontal synchronous signals HSYNC and vertical synchronous signals VSYNC. The horizontal synchronous signals are generated on the basis of a line on a display screen, while the vertical synchronous signals are generated when image signals of one frame are terminated. In short, the vertical synchronous signal is generated after a camera outputs image signals of one frame.

For example, one of the first and second cameras 22, 24 may be a Video Graphics Array (VGA) camera set up in the outside of a case of the mobile terminal 10 to photograph a third party, while the other camera may be a 1.3M-class camera set up in the inside of the mobile terminal case to photograph the holder of the mobile terminal while the holder holds the mobile terminal 10. The two cameras 22, 24 may be operated simultaneously. This will be described in detail later on.

The image processor 25 may simultaneously process the image signals and synchronous signals received from the two cameras 22, 24. For example, when the image signals outputted from the two cameras 22, 24 are previewed on the display 40 simultaneously, the image processor 25 converts the image signals into image data of an appropriate format to be displayed on the display and outputs them into the display.

The controller 30 controls the general operation of the mobile terminal 10. For example, the controller 30 processes and controls speech communication and data communication. In addition to conventional functions, the controller 30 may also be configured to control the image processor 25. The description of conventional processing and control of the controller 30 is not necessary to understand embodiments of the invention and will be omitted herein for clarity.

As illustrated in FIG. 1, the image processor 25 is shown configured within the controller 30.

The display 40 shows either a still picture or moving picture based on the image data received. The display 40 may be configured in the form of a liquid crystal display (LCD), an organic light emitting diode (OLED), or a plasma display panel (PDP).

Figure 2A:
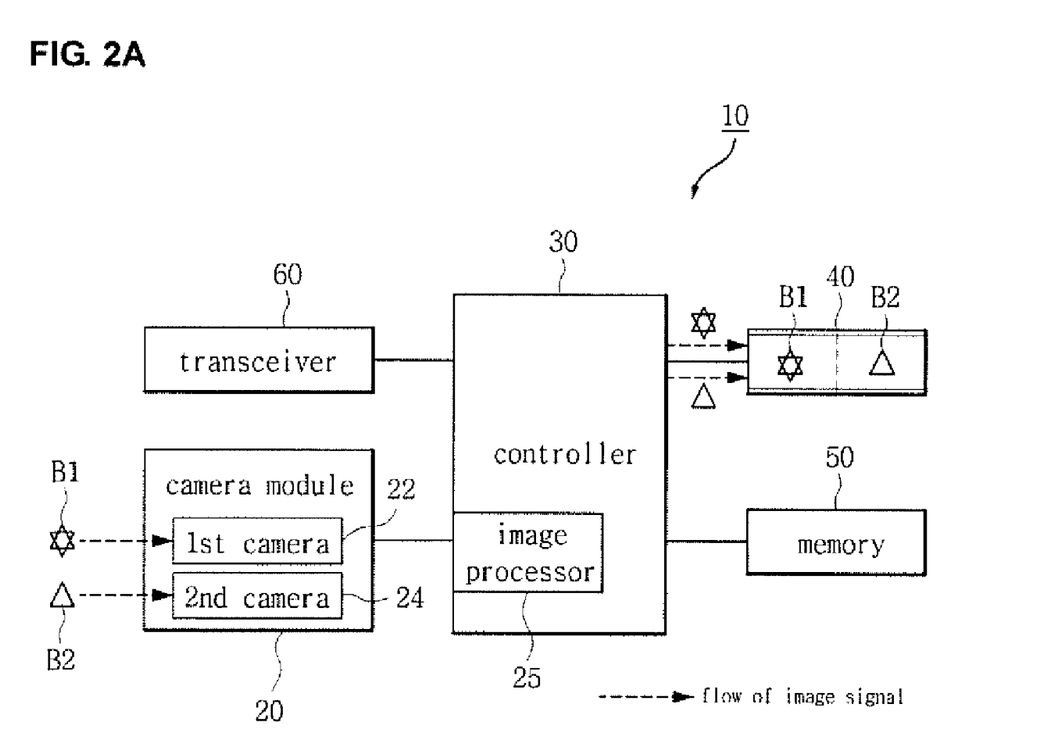
FIGS. 2A to 2C are block diagrams illustrating how image signals output from two cameras of the mobile terminal of FIG. 1 are used with other elements according to an embodiment of the present invention.

As illustrated in FIG. 2A, the display 40 can simultaneously display the image signals outputted from the first and second cameras 22, 24 on one screen. When the two cameras 22, 24 provide the image signals acquired by photographing two objects B1 and B2, synchronous signals are provided to the image processor 25. Upon receiving these signals, the image processor 25 performs processing, such as scheduling and compression, and provides the acquired image data to the display 40 to display the images of the two objects B1 and B2 on the display 40. The display 40 can also display the image data provided from the image processor 25 in the form of a preview.

The memory 50 comprises a program memory, a data memory, and a non-volatile memory. The program memory stores a program for controlling the general operation of the mobile terminal 10. The program memory uses a flash memory. The data memory temporarily stores data generated during operation of the mobile terminal 10. A Random Access Memory (RAM) may be used as the data memory. The non-volatile memory stores a system parameter and data for long-term storage of data such as telephone numbers, short message service (SMS) messages, image data, and the like. An Electrical Erasable Programmable Read Only Memory (EEPROM) may be used as the non-volatile memory.

Figure 2B:
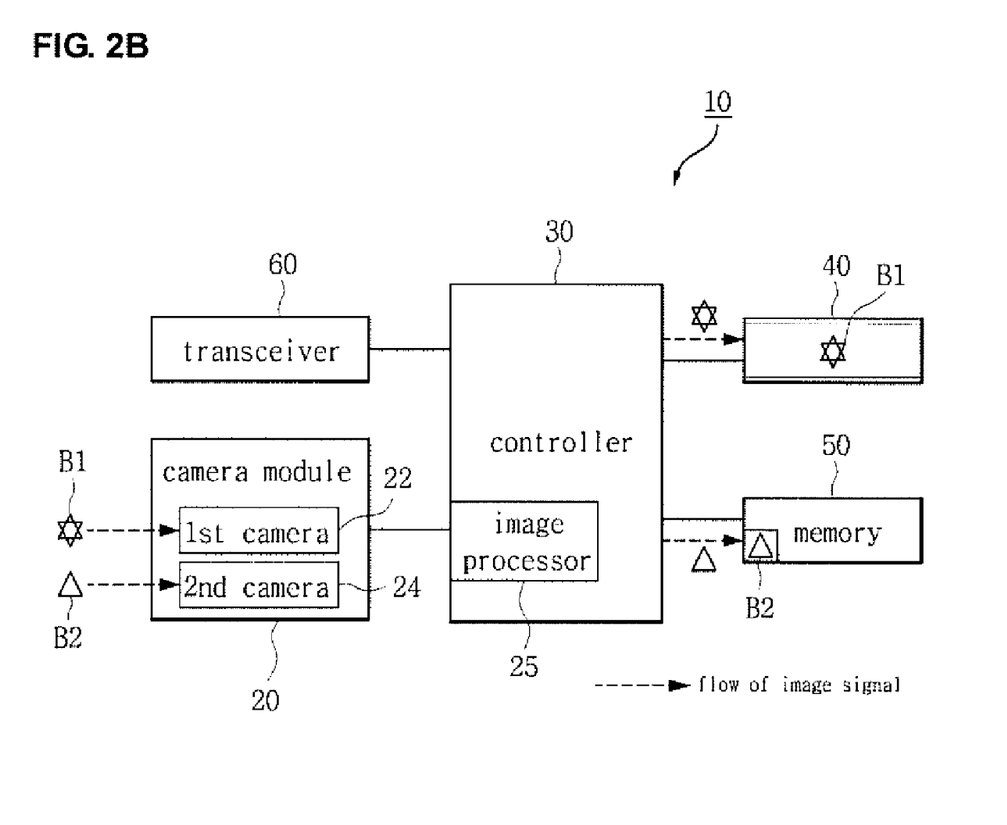

Referring to FIG. 2B, the image processor 25 receives the image signals outputted from the first and second cameras 22, 24, converts the image signals into image data, and stores the image data in the memory 50. Alternatively, as illustrated in FIG. 2B, image data of either of the two objects B1 and B2, such as the object B1, may be displayed on the display 40, and the image data of the other object, such as the object B2, may be converted into image data by the image processor 25 and stored in the memory 50.

The transceiver 60 converts radio frequency (RF) signals received through an antenna into baseband signals and provides them to the controller 30, or it converts baseband signals transmitted from the controller 30 into RF signals and transmits them through the antenna. The mobile terminal 10 performs speech communication and data communication through the transceiver 60.

Figure 2C:
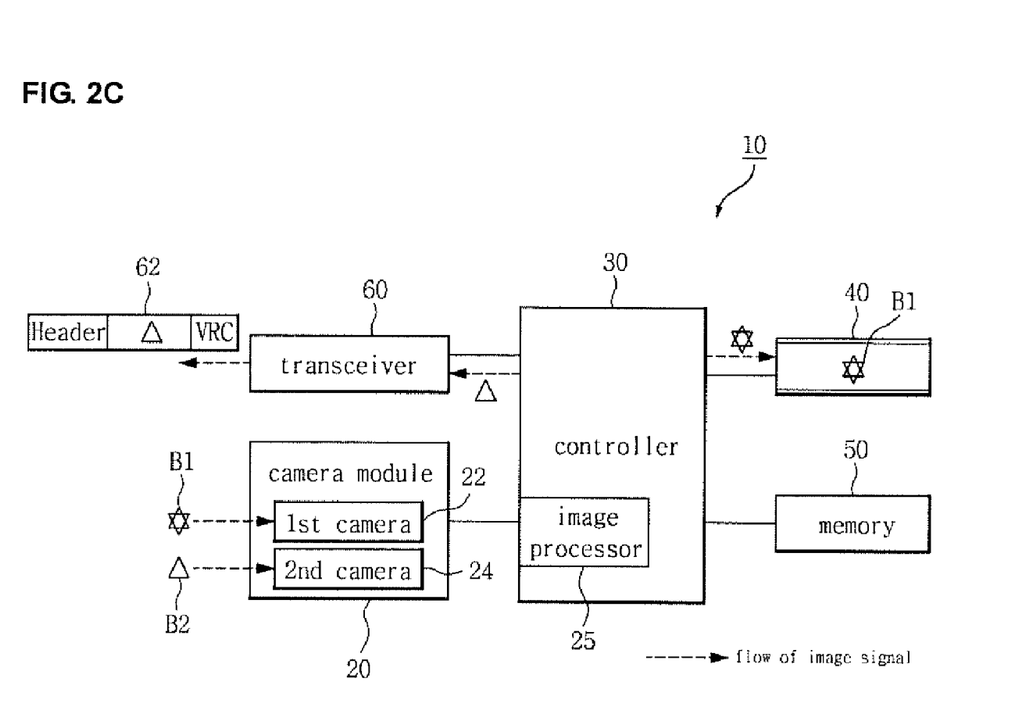

Referring to FIG. 2C, the transceiver 60 transmits the image data processed in the image processor 25 through the antenna. For example, as illustrated in FIG. 2C, image data of either of the two objects B1 or B2 may be displayed on the display 40. That is, the object of B1 may be displayed on the display 40, while the object image data of the other object, B2, may be converted into a data packet 62 in the image processor 25 and transmitted to a base station, for example, through the transceiver 60.

For example, the image of one object B1 may be acquired by one of the two cameras 22, 24 located outside the case of the mobile terminal 10 and displayed on the display 40, while the other camera located inside the case photographs the mobile terminal user and transmits the image of the mobile terminal user through the transceiver 60. Thereby, three-party video chatting or multiple-party video conference can be conducted.

Figure 3A:
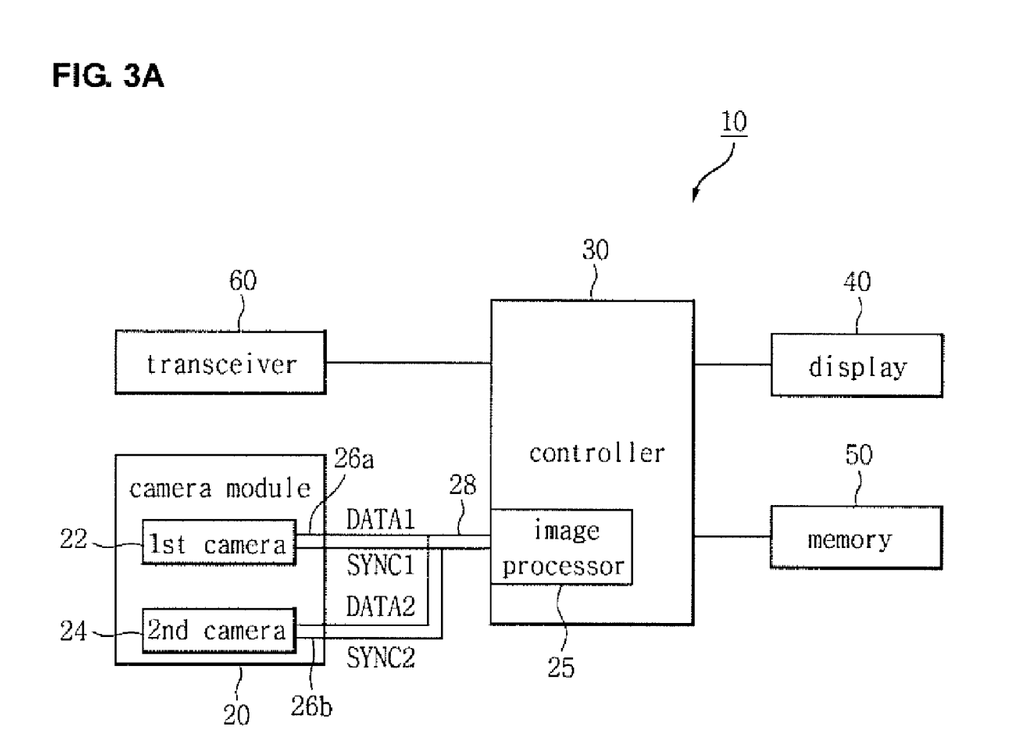
FIGS. 3A and 3B are block diagrams illustrating an arrangement of a camera module and an image processor according to an embodiment of the present invention.

Referring to FIG. 3A, the first and second cameras 22, 24 may be electrically connected to the image processor 25 through signal lines 26a and 26b extending from the respective two cameras 22, 24 and integrating into signal line 28. In this case, the synchronous signals SYNC1 and SYNC2 outputted from the respective cameras 22, 24 and the image signals DATA1 and DATA2 are outputted into the image processor 25 through the same signal line 28.

Therefore, the signal lines 26a and 26b extending from the two cameras 22, 24 can be commonly connected to the image processor 25.

Figure 3B:
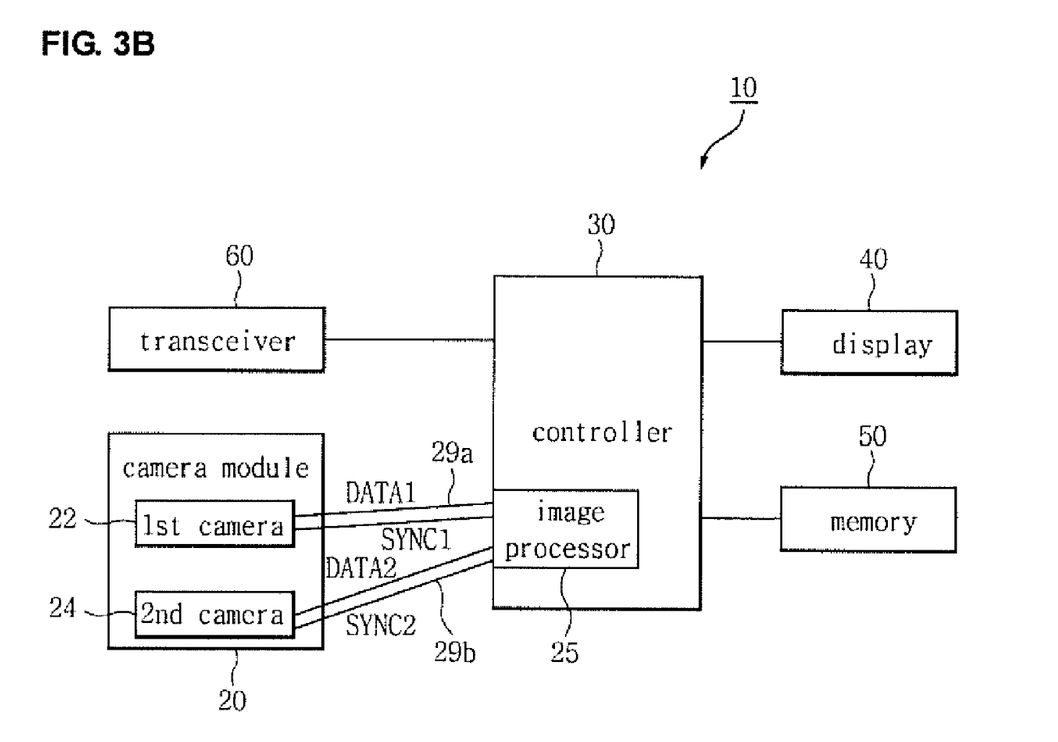

Referring to FIG. 3B, the two cameras 22, 24 may be electrically connected to the image processor 25 inside the controller 30 through independent signal lines 29a and 29b, respectively. These signal lines being independent since the data and synch signals from one camera are not combined with data and synch signals from the other camera.

The synchronous signals SYNC1 and SYNC2 and the image signals DATA1 and DATA2 outputted from the cameras 22, 24 are transmitted to the image processor 25 through different signal lines 29a and 29b. For separate transmission, connector pins associated with the controller 30 may be connected to the signal lines from the two cameras 22, 24. When the image processor 25 is configured in the form of a chip separate from the controller 30, the image processor 25 may have pins for accommodating the two cameras 22, 24.

Figure 4A:
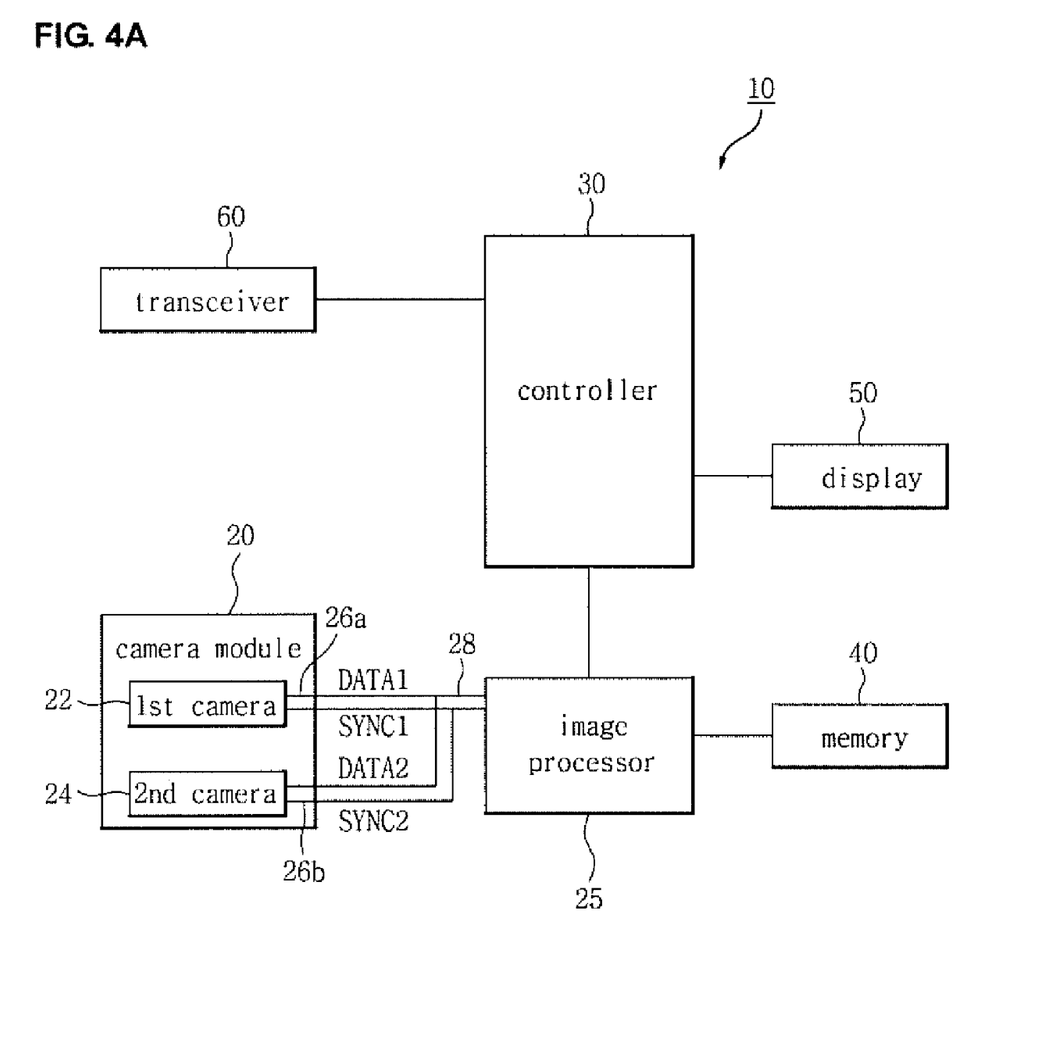
FIGS. 4A and 4B are block diagrams illustrating an arrangement of the camera module and the image processor shown in FIG. 1 according to another embodiment of the present invention.
Figure 4B:
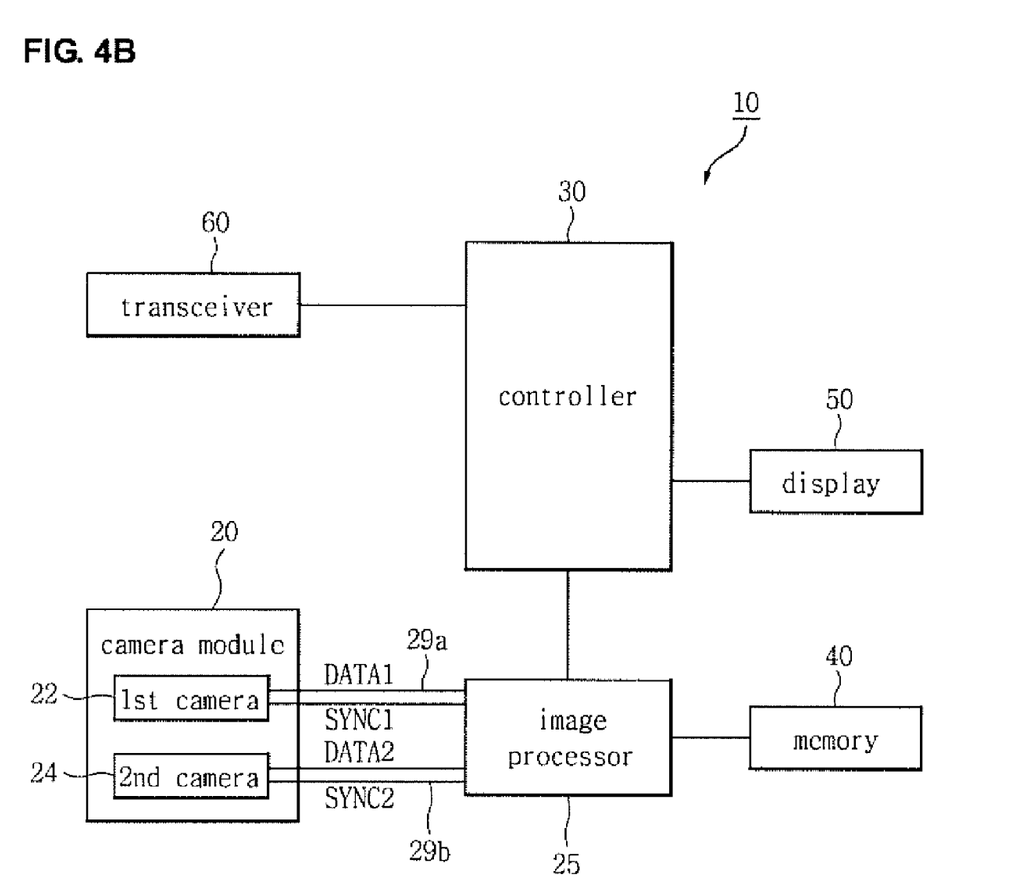

Referring to FIGS. 4A and 4B, the mobile terminal 10 has the image processor 25 configured as an independent element from the controller 30. In this case, the mobile terminal 10 is designed to have a general Digital Signal Processor (DSP) function as the image processor 25, or the image processor 25 can be configured in the form of an IC chip.

The mobile terminal 10 illustrated in FIG. 4A may have the two cameras 22, 24 electrically connected to the image processor 25 through the signal lines 26a and 26b extended from the two cameras 22, 24 and integrating into signal line 28, as previously described with reference to FIG. 3A. In this case, the synchronous signals SYNC1 and SYNC2 and image signals DATA1 and DATA2 outputted from the cameras 22, 24 are outputted into the image processor 25 through the same signal line 28.

The mobile terminal 10 illustrated in FIG. 4B is electrically connected to the independent image processor 25 through different signal lines 29a and 29b, and in a manner similar to that illustrated in the mobile terminal of FIG. 3B.

Figure 5:
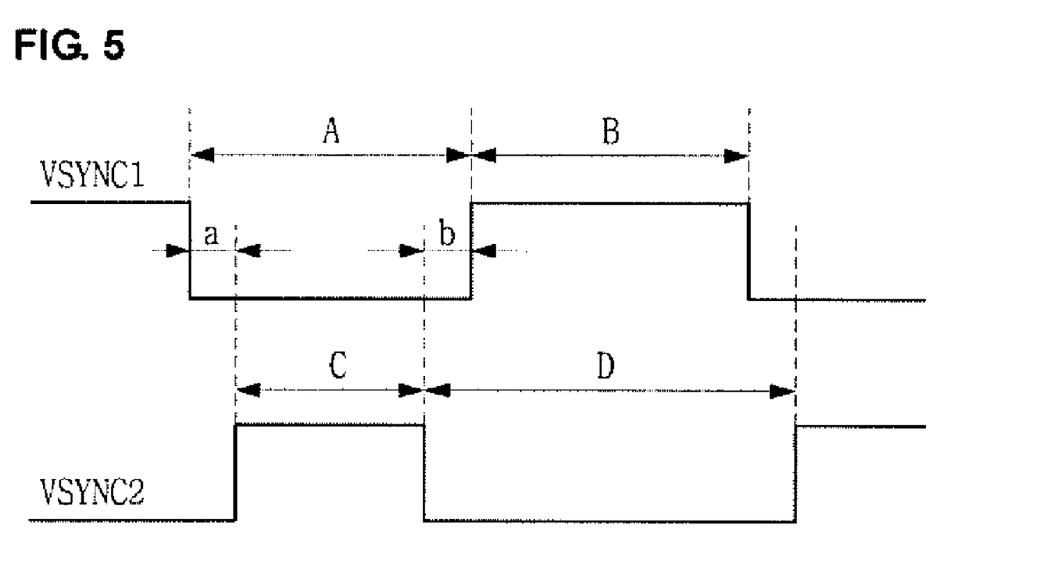
FIGS. 5 and 6 are diagrams of the image signals of two cameras outputted to the image processor according to an embodiment of the present invention.

Referring to FIG. 5 and FIG. 3A, the first and second cameras 22, 24 simultaneously output image signals acquired by photographing the objects, respectively, and output the synchronous signals into the image processor 25.

The two cameras 22, 24 create horizontal synchronous signals HSYNC on the basis of a line of the screen shown on the display 40. Also, the two cameras 22, 24 generate vertical synchronous signals VSYNC after outputting the image signals of a first frame.

The vertical synchronous signals VSYNC go through an active time and an inactive time on a frame-by-frame basis. The active time of a vertical synchronous signal is a duration where the two cameras 22, 24 output one-frame image signal into the image processor 25, whereas the inactive time of the vertical synchronous signal is a duration where the two cameras 22, 24 do not output image signals into the image processor 25.

For example, as shown in FIG. 5, the first camera 22 creates a first vertical synchronous signal VSYNC1 having an active time (B) and an inactive time (A) on a single frame basis. Likewise, the second camera 24 creates a second vertical synchronous signal VSYNC2 having an active time (C) and an inactive time (D) on a single frame.

The active time (C) of the signal outputted from the second camera 24 is controlled to transmit during the inactive time (A) of the signal outputted from the first camera 22. Also, the active time (B) of the signal outputted from the first camera 22 is controlled to transmit during the inactive time (D) of the signal outputted from the second camera 24. Since the active time of the signal outputted from one of the two cameras 22, 24 is controlled to transmit during the inactive time of the signal outputted from the other camera, the image signals of the two cameras 22, 24 can be delivered to the image processor 25 with little or no loss.

Figure 6:
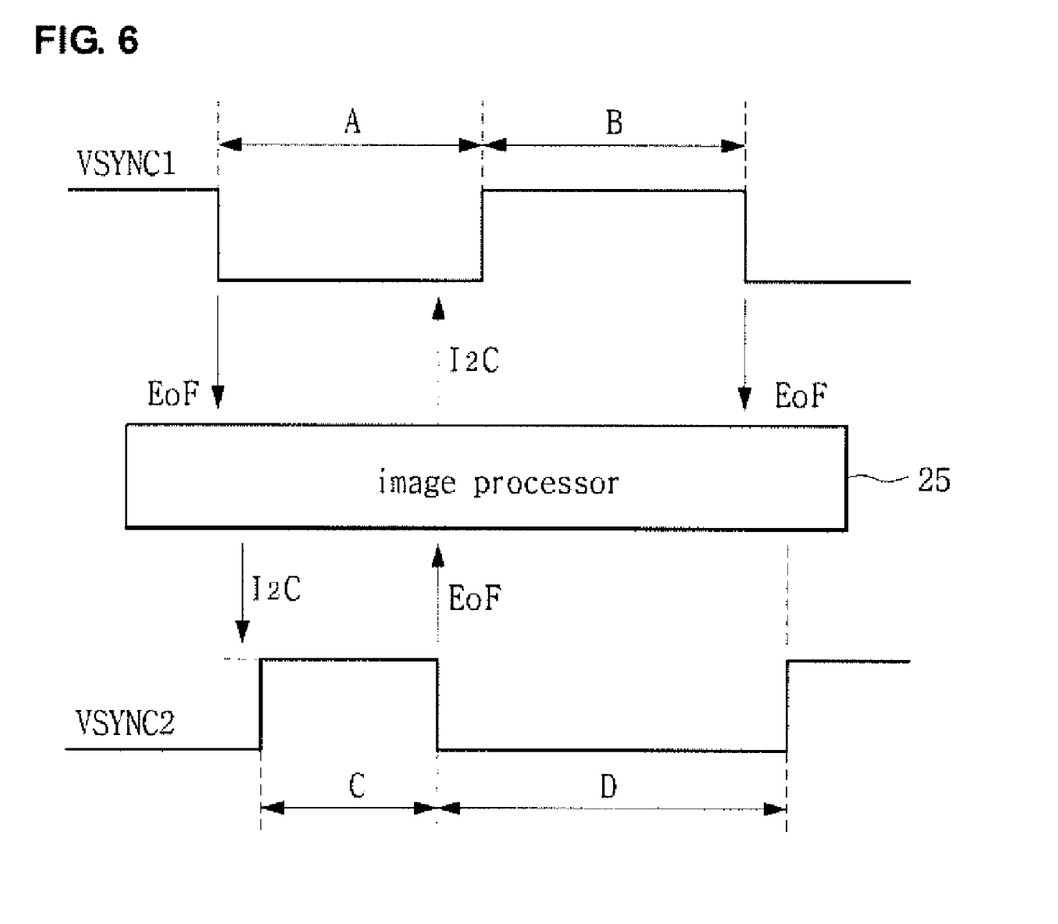

Referring to FIG. 6, the image processor 25 determines the End of Frame (EOF) when the active time of the vertical synchronous signals VSYNC1 and VSYNC2 of the two cameras 22, 24 are terminated. The EOF may also be determined by detecting the falling edge signals of the vertical synchronous signals VSYNC1 and VSYNC2. For example, the image processor 25 receives a first vertical synchronous signal VSYNC1 from the first camera 22, and determines a falling edge signal of the first vertical synchronous signal VSYNC1 from the first camera 22 as the EOF.

Subsequently, after a predetermined time (Δt1) passes, the image processor 25 outputs a control signal corresponding to the EOF of the first camera to the second camera 24 using, for example, a I2C (Inter-IC). The second camera 24 creates the second vertical synchronous signal VSYNC2 based on the control signal transmitted from the image processor 25 and transmits it to the image processor 25. The generation of the second vertical synchronous signal in the second camera 24 signifies that image signals of one frame are outputted to the image processor 25.

Since the second camera 24 outputs the second vertical synchronous signal VSYNC2 while outputting the image signal of one frame, the second camera 24 performs the same operation as the above-described first camera 22.

Consequently, image signals of the second camera 24 are outputted to the image processor 25 during the inactive time (or inactive time) of the vertical synchronous signals VSYNC of the other camera, i.e., the first camera 22. The image signals of the first camera 22 are outputted to the image processor 25 during the inactive time of the vertical synchronous signals of the second camera 24. Therefore, the two cameras 22, 24 can be used simultaneously.

In accordance with an embodiment of the present invention, image signals may be outputted from the two cameras 22, 24, regardless of whether an independent image processor 25 or a controller 30 including the image processor 25, as illustrated in FIGS. 3A and 4A, provide connector pins corresponding to one or two cameras.

Since the first and second cameras 22, 24 can output image signals to the image processor 25, it is possible to use the image signals from the two cameras 22, 24 through the display 40, the memory 50, and/or the transceiver 60, as illustrated in FIGS. 2A to 2C.

Figure 7:
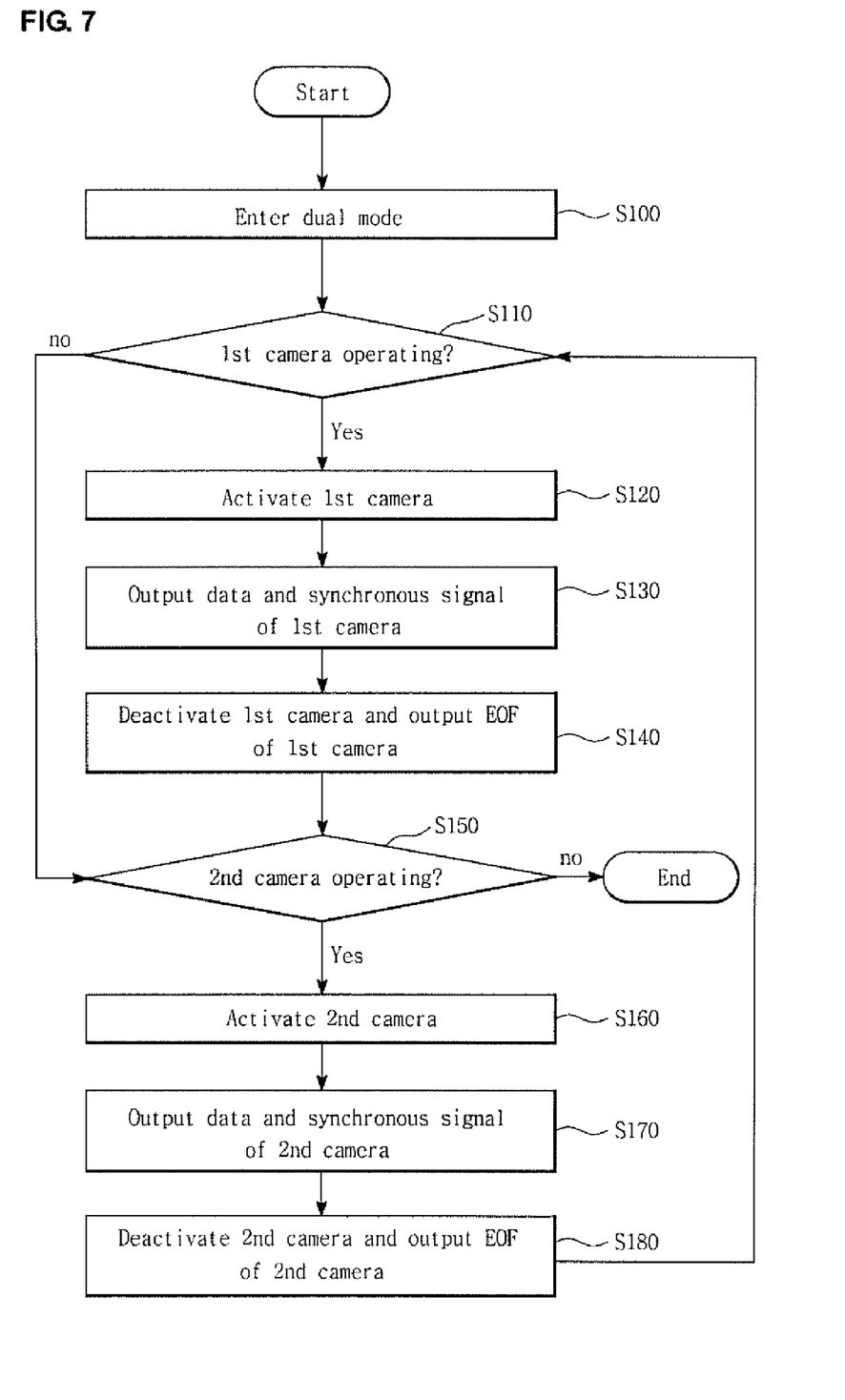
FIG. 7 is a flowchart describing image processing according to an embodiment of the present invention.

Referring to FIG. 7, the image processing method will be described according to an embodiment of the present invention. In step S100, the mobile terminal 10 enters a dual mode. Specifically, the camera module 20 enters the dual mode wherein the two cameras 22, 24 of the camera module 20 are requested to operate.

In step S110, it is determined whether one of the two cameras 22, 24, e.g., the first camera 22, operates when the camera module 10 enters the dual mode. When the first camera 22 operates, the first camera 22 is activated in step S120 and image signals of one frame and synchronous signals are created and outputted in step S130. Herein, the synchronous signals comprise a horizontal synchronous signal generated on the basis of a line on the display screen and a vertical synchronous signal generated on the basis of one frame.

In step S140, the first camera 22 is deactivated upon receipt of a falling edge signal of the vertical synchronous signal, and the falling edge signal of the first camera is determined as an EOF signal of one frame in the first camera.

Subsequently, in step S150, it is determined whether the second camera 24 is operated. When the second camera 24 operates, the camera is activated to create image signals of one frame and synchronous signals in step S160, and outputs the signals in step S170.

In step S180, the second camera 24 is deactivated upon receipt of a falling edge signal of the vertical synchronous signal, and the falling edge signal of the second camera 24 is determined as an EOF signal of one frame in the second camera 24.

The steps S100 to S180 are repeated on a frame-by-frame basis as long as the dual mode is maintained.

Although the present invention has been described with reference to the previous descriptions, the present invention is not limited thereto.

Figure 8:
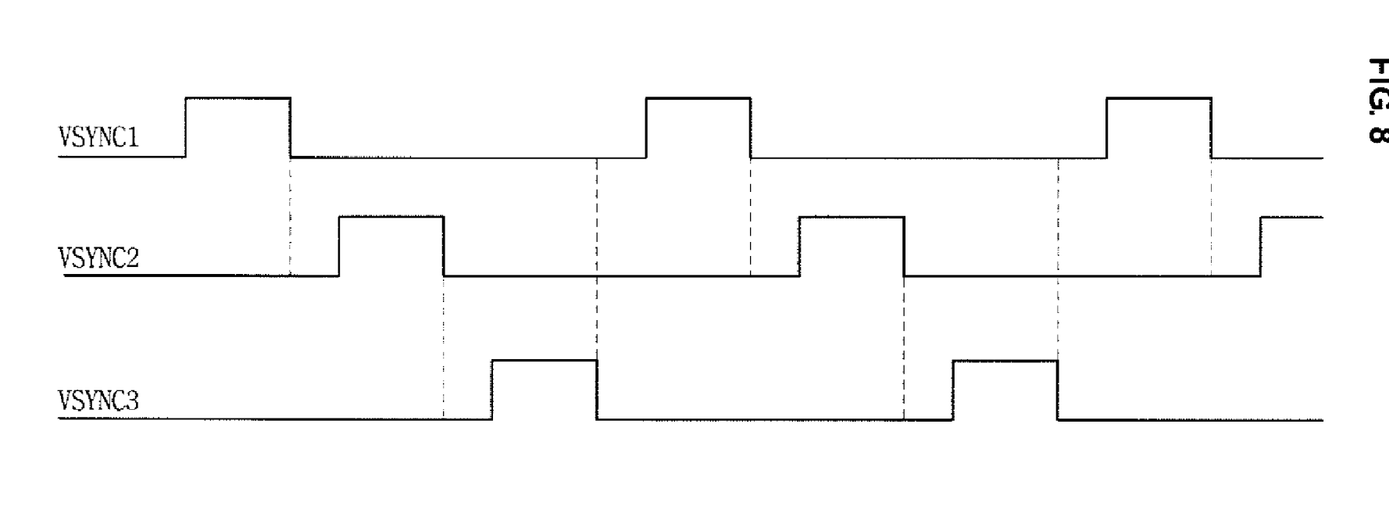
FIG. 8 is a diagram of the image signals of three cameras outputted to the image processor according to an embodiment of the present invention.

In the above-described embodiments, the camera module 20 comprises the two cameras 22, 24, and image signals of one camera are outputted to the image processor 25 during the inactive time of the other camera, while the image signals of the other camera are outputted to the image processor 25 during the inactive time of the one camera. However, the present invention is not limited to the previous embodiment. Alternatively, the camera module 20 may include three or more cameras. For example, as illustrated in FIG. 8, when the camera module comprises three cameras, the image signals of two cameras may be outputted to the image processor 25 during the inactive time of the third camera. Consequently, the three cameras can output their image signals to the image processor 25 while the inactive time of two cameras are overlapped.

The present invention has been described to have independent lines or interfaces for transmitting the synchronous signals, and uses the falling edge signal of a vertical synchronous signal as an EOF signal. However, the present invention is not so limited. For example, a camera interface may be formed of only pins for transmitting clocks and image signals in an Encrypted File System (EFS). In this case, 0x00 and 0xff are not used as image signals but instead are used as synchronous signals.

In the EFS mode, the pins for vertical synchronous signals and horizontal synchronous signals are not formed separately, and 0x00 and 0xff are identified as synchronous signals during data streaming. As a result, an EOF signal is generated by using the 0x00 and 0xff at the end of an active time to inform the end of a frame.

In the above embodiment, the mobile terminal 10 is a mobile communication terminal comprising a transceiver, but the present invention is not limited thereto. The mobile terminal 10 may be one of diverse information devices and electrical devices such as a camera without a transceiver, a Personal Digital Assistant (PDA), and a laptop computer.

The embodiments of the present invention have been described for illustrative purposes, and those skilled in the art will appreciate that various modifications, additions, and substitutions are possible without departing from the scope and spirit of the invention as disclosed in the accompanying claims. Therefore, the scope of the present invention should be defined by the appended claims and their legal equivalents.

What is claimed is:

1. A mobile terminal, comprising:
a plurality of cameras, each of the plurality of cameras configured to provide a synchronous signal during an inactive time period and a data image signal during an active time period, wherein the active time period during which one of the plurality of cameras provides the data image signal occurs during the inactive time period of the other of the plurality of cameras;
an image processor configured to receive and process the synchronous signal and the data image signal; and
a display configured to display the data image signal from each of the plurality of cameras simultaneously,
wherein at least one of the plurality of cameras is configured for photographing a first object and at least another of the plurality of cameras is configured for photographing a second object different from the first object,
wherein the synchronous signal is a vertical synchronous signal configured to go through the active time period and the inactive time period on a frame-by-frame basis, and
wherein each of the plurality of cameras is further configured to output the synchronous signal and the data image signal to the image processor through a same single signal line integrating separate signal lines extended from each of the plurality of cameras.

2. The mobile terminal of claim 1, wherein each of the plurality of cameras is further configured to provide a plurality of synchronous signals during a corresponding plurality of inactive time periods, and a plurality of data image signals during a corresponding plurality of active time periods, wherein each of the plurality of active periods during which one of the plurality of cameras provides one of the plurality of data image signals occurs during one of the plurality of inactive time periods of the other of the plurality of cameras,
wherein the image processor is further configured to receive and process the plurality of synchronous signals and the plurality of data image signals.

3. The mobile terminal of claim 1, wherein each of the plurality of cameras is further configured to output an End Of Frame (EOF) signal informing an end of the active time period to the image processor, and the image processor is further configured to output a control signal corresponding to the EOF signal to the other of the plurality of cameras.

4. The mobile terminal of claim 3, wherein the EOF signal is a falling edge signal of a vertical synchronous signal.

5. The mobile terminal of in claim 3, wherein the EOF signal is inserted between frames of the data image signal.

6. The mobile terminal of claim 1, further comprising a controller configured to control general mobile terminal operations, wherein the image processor is located within the controller.

7. The mobile terminal of claim 1, further comprising at least a display, a communication unit, or a memory to receive and process the data image signal output from at least one of the plurality of cameras.

8. The mobile terminal of claim 7, further comprising at least two of the display, the communication unit or the memory and wherein when one of the display, the communication unit, and the memory receives and processes the data image signal from one of the plurality of cameras, another object captured by another of the plurality of cameras is output to another one of the display, the communication unit, and the memory to receive and process the data image signal.

9. A method for processing image data in a mobile terminal, the method comprising:
simultaneously operating a plurality of cameras;
outputting a synchronous signal during an inactive time period and a data image signal during an active time period, wherein the active time period during which one of the plurality of cameras outputs the data image signal occurs during the inactive time period of the other of the plurality of cameras;
receiving and processing the synchronous signal and the data image signal output from the one of the plurality of cameras; and
displaying the data image signal from each of the plurality of cameras on a display simultaneously,
wherein at least one of the plurality of cameras is configured for photographing a first object and another of the plurality of cameras is configured for photographing a second object different from the first object,
wherein the synchronous signal is a vertical synchronous signal configured to go through the active time period and the inactive time period on a frame-by-frame basis, and
wherein each of the plurality of cameras output the synchronous signal and the data image signal to the image processor through a same single signal line by integrating signal lines extending from the plurality of cameras.

10. The method of claim 9, further comprising:
sequentially receiving an End of Frame (EOF) signal from each of the plurality of cameras;
outputting sequentially from each of the plurality of cameras a control signal corresponding to the EOF signal to the other of the plurality of cameras,
wherein the EOF signal is for informing that an active time period is terminated and is individually output from each of the plurality of cameras one after the other.

11. The method of claim 10, wherein the EOF signal is generated upon detection of a falling edge signal of a vertical synchronous signal.

12. The method of claim 10, wherein the EOF signal is activated between the frames of the data image signal output by each of the plurality of cameras.

13. The method of claim 9, wherein the data image signal of objects captured by two of the plurality of cameras are output during inactive time periods of another of the plurality of cameras.

14. The method of claim 9, wherein when a first object captured by one of the plurality of cameras is stored in a memory or output for at least displaying on the display or communicating via a transceiver, a second object captured by another of the plurality of cameras is stored in the memory or output for at least displaying on the display or communicating via the transceiver.

* * * * *